United States Patent [19]
Bando et al.

[11] Patent Number: 5,774,548
[45] Date of Patent: Jun. 30, 1998

[54] DIGITAL BROADCAST TRANSMITTING AND RECEIVING SYSTEM AND TRANSMITTING AND RECEIVING APPARATUS THEREOF

[75] Inventors: Yumi Bando; Toshinori Murata; Takumi Okamura; Kenji Katsumata; Masaru Nanki; Takanori Eda; Satoshi Imuro; Satoru Takashimizu, all of Yokohama, Japan

[73] Assignee: Hitachi, Ltd., Tokyo, Japan

[21] Appl. No.: 707,530

[22] Filed: Sep. 4, 1996

[30] Foreign Application Priority Data

Sep. 5, 1995 [JP] Japan .................................. 7-227722

[51] Int. Cl.⁶ .......................... H04K 1/02; H04N 7/167
[52] U.S. Cl. .................................. 380/9; 380/5; 380/10; 380/20
[58] Field of Search ................................ 380/9, 10, 5, 20

[56] References Cited

U.S. PATENT DOCUMENTS 4,471,380  9/1984  Mobley .
4,821,260  4/1989  Klank et al. .
5,509,073  4/1996  Monnin ................................ 380/20

*Primary Examiner*—Stephen C. Buczinski
*Attorney, Agent, or Firm*—Antonelli, Terry, Stout & Kraus, LLP

[57] ABSTRACT

An arrangement to automatically change between a scrambled digital data output and descrambled digital data output of a receiver by inserting a control signal conforming to a program provider's policy into a transmission signal. In a receiving side, a descrambler descrambles a channel-decoded signal, a demultiplexer demultiplexes the multiplexed signal from the descrambler into encoded video and audio data for output to a source decoder, and extracts the control information inserted in the transmitting side for output to a switch or CPU. The CPU decrypts a control signal from the control information extracted by the demultiplexer to determine whether the scrambled digital signal or descrambled digital signal is appropriate for output, and outputs a changeover control signal depending on the result of decryption. A switch selects the output of a scrambled digital signal from a stage prior to the descrambler, or a descrambled digital signal from a stage subsequent to the descrambler, depending on the changeover control signal from the CPU. Thereby, a scrambled digital signal output or descrambled digital signal output can automatically be changed over depending on a program provider's policy.

21 Claims, 6 Drawing Sheets

DIGITAL BROADCAST TRANSMITTING AND RECEIVING SYSTEM AND TRANSMITTING AND RECEIVING APPARATUS THEREOF

BACKGROUND OF THE INVENTION

1. Field of the Invention

The present invention relates to a digital broadcast transmitting and receiving system, and more particularly, relates to a control system and a transmitting and receiving apparatus for automatically changing over and outputting one of a scrambled digital signal and a descrambled digital signal by inserting control information conforming to a program provider's policy within a transmission signal, and then decoding and utilizing such control information in a receiving side.

2. Description of Related Art

A restricted receiving system in a digital broadcast receiver of a background approach is based on a construction shown in FIG. 2. In FIG. 2, numeral 201 designates a video-audio-data input terminal; 202, a scramble key (Ks) input terminal; 203, a work key (Kw) input terminal; 204, a master key (Km) input terminal; 205, a scrambler; 206, a Ks encrypting means; 207, a Kw encrypting means; 208, a descrambler; 209, a Ks decrypting means; 210, a Kw decrypting means; 211, a video-audio-data output terminal; 212, a program attribute information input terminal; and, 213, a contract information input terminal.

The restricted receiving system of the background approach will be explained with reference to FIG. 2. In the transmitting side, the scrambler 205 scrambles a transport stream (TS) inputted from the video-audio-data input terminal 201 for the purpose of restricted reception. The scrambled signal is transmitted to the receiving side together with program information (ECM) and individual information (EMM). Here, ECM is information obtained by encrypting a scramble key (Ks) and a attribute information of a program. The work key (Kw) is used for decoding such encrypted information. The work key (Kw) is also encrypted together with the contract information and is then transmitted to the receiving side as the individual information (EMM). The master key (Km) is used for decoding the encrypted EMM.

In the receiving side, EMM and ECM are extracted from the received signals, the encrypted signals are decrypted, and it is judged whether the received program can be descrambled based on an access contract existing with respect to the receiving side. When contents of such contract are satisfied (i.e., access is authorized), Kw is decrypted by Km, and moreover, Ks decrypted by Kw is transferred to the descrambler 208 for descrambling.

In the above system, when data output to a recording medium such as a VTR (Video Tape Recorder) is considered, if access is authorized and a descrambled signal is output, recording and subsequent copyright infringement are of concern, i.e., multiple unpaid subsequent viewings of the recorded (descrambled) program. More particularly, in such case, only a first watching of the descrambled program is charged in a chargeable program system, for example, at a time of initial selection, descrambling and viewing of the program. If the program is recorded on a recording medium at the time of the first descrambling and watching, the program can be watched many times without charging after the first watching. Such recording and subsequent multiple uncharged viewing of the program represents a potential copyright infringement resulting in a loss of revenue for a copyright owner.

One way to avoid such potential copyright infringement would be to arrange a system wherein a scrambled signal is always output as a recording output from the digital broadcast receiver, wherein a viewer can watch a reproduced analog program only when the program is broadcasted. However, there may be situations where both a viewer desires to digitally record a certain program for later viewing and a program provider is agreeable to allow authorized viewers to digitally record the program for later and/or multiple viewing.

Accordingly, in the structure explained above, a certain problem is incurred in that there is no system provided to allow authorized digital recording of programs according to a program provider's policy.

SUMMARY OF THE INVENTION

It is therefore an object of the present invention to provide a system and apparatus which allow selective authorized digital recording of programs according to a program provider's policy. It is another object of the present invention to provide a digital broadcast transmitting and receiving apparatus which can automatically change over a digital data output signal supplied to an external apparatus (such as a recorder) from a scrambled digital signal to a descrambled digital signal, or vice versa, depending on the program provider's policy, with the problems explained above completely solved.

In order to solve the problems explained above, the digital broadcast transmitting and receiving system of the present invention comprises control information inserted into a transmission signal in the transmitting side, and a channel decoder, a descrambler, a demultiplexer, a source decoder, CPU and a switch in the receiving side. In the transmitting side, control information conforming to the program provider's policy is inserted into a transmission signal. In the receiving side, multiple operations are conducted, i.e., the channel decoder executes processings such as channel selection, digital demodulation and error correction, the descrambler descrambles the scramble signal effectuated for restricted reception, the demultiplexer demultiplexes multiplexed information into the encoded data of video and audio signals and also extracts the control information inserted at the transmitting side. Further, the source decoder decodes encoded data, the CPU decrypts a control signal for changing over the output signal of a scrambled signal or a descrambled signal from the control information extracted by the demultiplexer, and a switch outputs, as a result of changeover, a scrambled digital signal or descrambled digital signal depending on the control signal from the CPU.

In accordance with the present invention, control information conforming to the program provider's policy is inserted into a transmission signal in the transmitting side, while in the receiving side, a channel-decoded signal is descrambled by the descrambler, multiplexed information is demultiplexed by the demultiplexer into the encoded data of video and audio signals and are then output to the source decoder, and the control information inserted in the transmitting side is extracted and is then sent to the CPU. The source decoder respectively decodes the encoded video and audio data. The CPU decrypts a control signal from the control information extracted by the demultiplexer to determine whether a scrambled digital signal or a descrambled digital signal should be output. Therefore, automatic switching for the output of a scrambled digital signal or a descrambled digital signal is enabled by changing over the switch depending on the result of the above judgment. As explained above, the present invention provides a digital broadcast transmitting and receiving apparatus which can provide a digital signal (e.g., a recording signal) output conforming to the program provider's policy.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention.

These and other objects, features and advantages of the present invention will become more apparent from the following description when taken in conjunction with the accompanying drawings.

BRIEF DESCRIPTION OF THE DRAWINGS

The following represents brief descriptions of the drawings, wherein.

DETAILED DESCRIPTION OF THE PREFERRED EMBODIMENTS OF THE INVENTION

Figure 7:
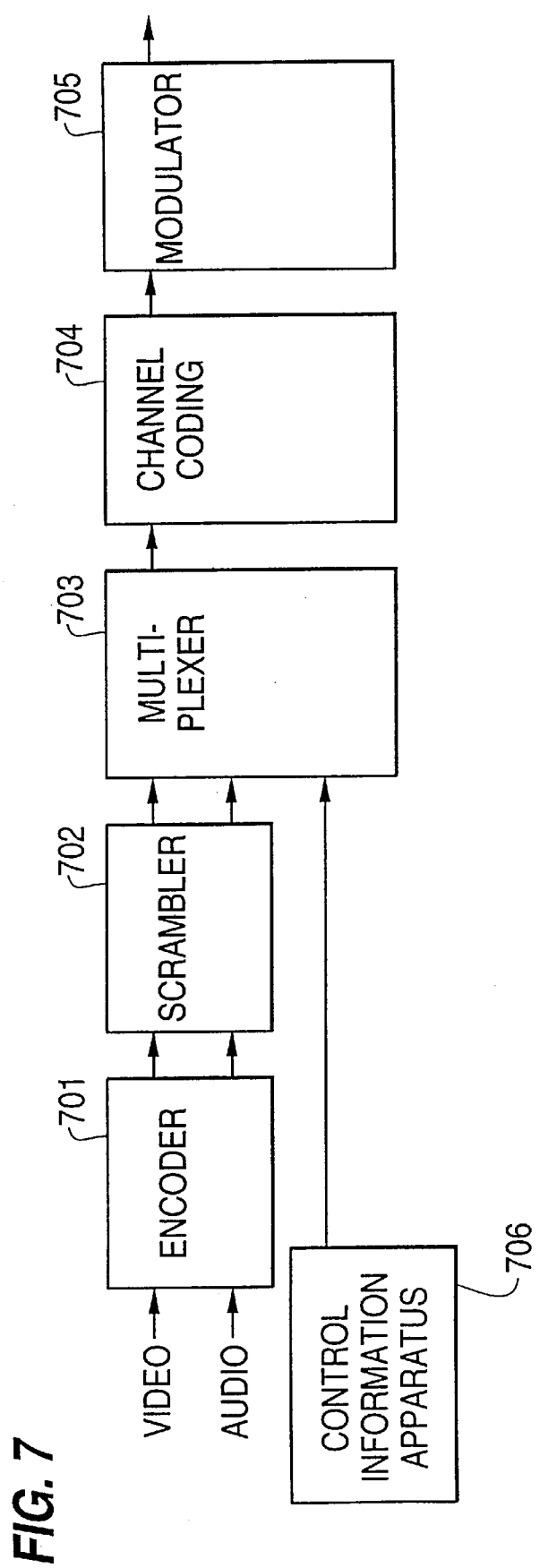
FIG. 7 is a block diagram illustrating a transmitting side of the present invention.

Referring now to the drawings wherein like reference numerals are utilized to designate like parts, the present invention will be explained hereunder. FIG. 7 shows a block diagram illustrating a transmitting side of the present invention. More particularly, a video and an audio signal are input through an encoder 701 and a scrambler 702, to a multiplexer 703. The multiplexer 703 additionally receives control information from a control information apparatus 706, and multiplexes the encoded/scrambled video and audio signals and control information to output a multiplexed output. A channel coding arrangement 704 receives the multiplexed output and delivers a channel coded output to a modulator 705. A modulated output (e.g., frequency modulated, time modulated, frequency/time modulated, etc.) from the modulator 705 is transmitted to receivers through any appropriate transmission means (e.g., broadcast transmission, cable transmission, digital satellite transmission, optical transmission, etc.)

The transmitted signal from the FIG. 7 transmission side includes the control information which controls whether a scrambled or descrambled digital output should be delivered to an external output terminal (e.g., digital output terminal) of a receiver apparatus, i.e., according to an access policy of a program provider. At this point, it is useful to note that the control information can be used to effect control beyond just whether a scrambled or descrambled digital output should be delivered, e.g., can be used to sensor out (e.g., block output and recording) of only portions of a program, etc. Further, in a preferred embodiment, the encoder 701 includes A/D converter arrangements for converting the analog video and audio signals to digital form.

Figure 1:
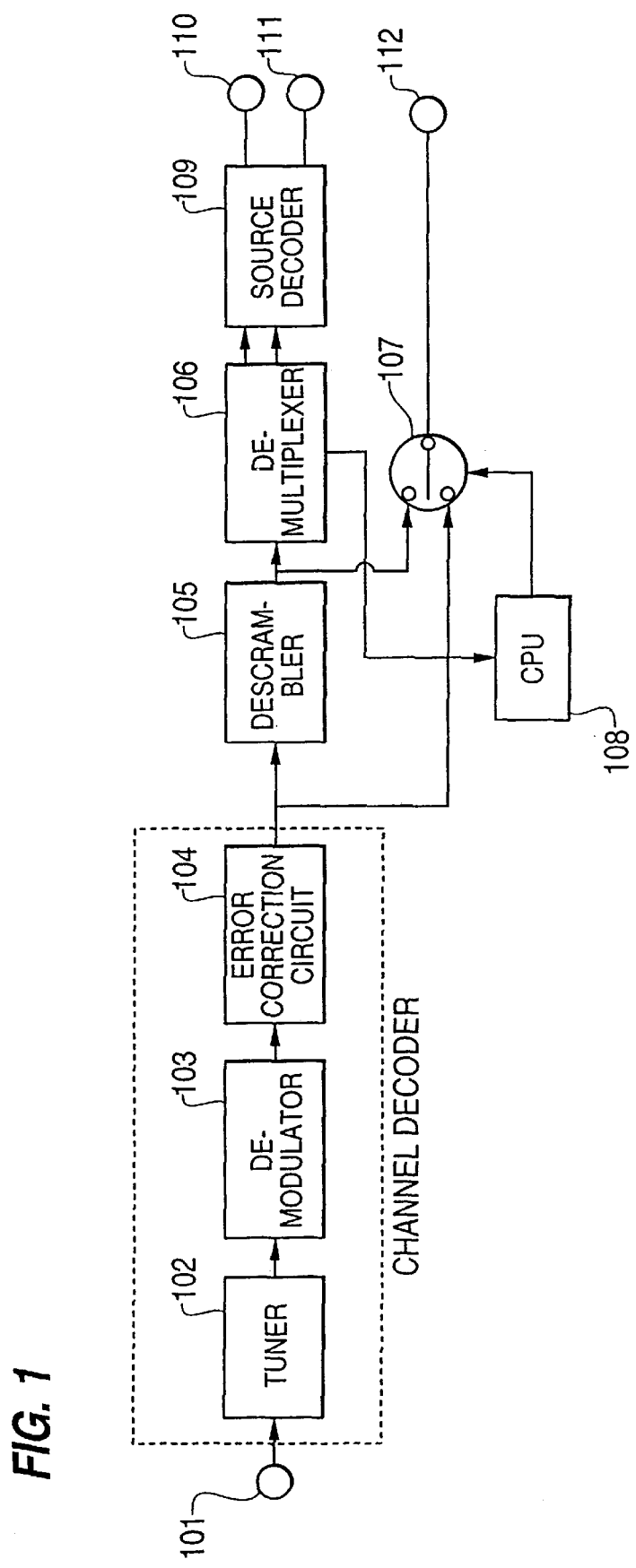
FIG. 1 is a block diagram illustrating a first embodiment of the present invention.
Figure 2:
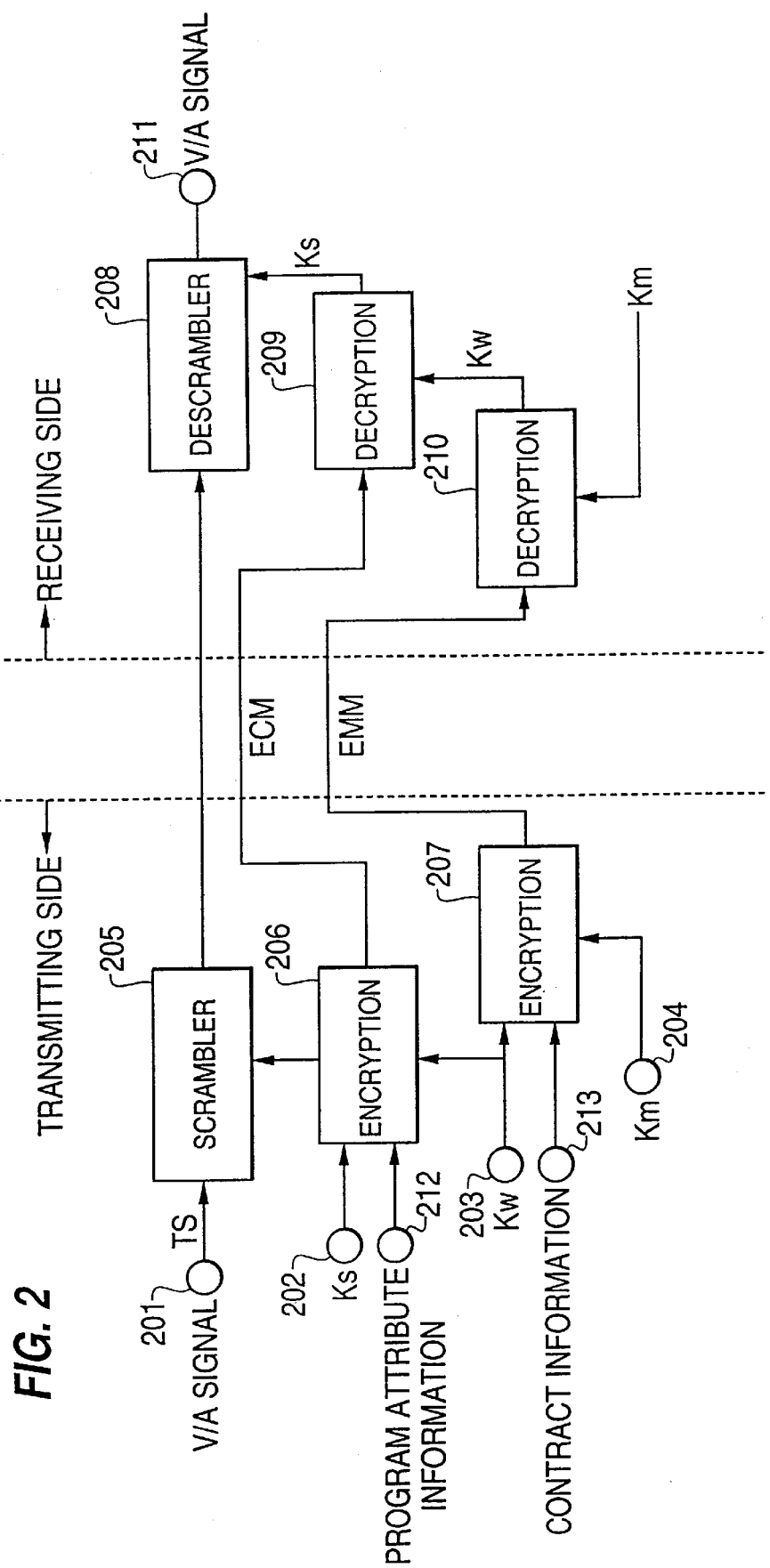
FIG. 2 is a diagram for explaining a background approach.

FIG. 1 shows a block diagram illustrating a receiving side embodiment of the present invention. In this figure, 101 denotes a signal input terminal; 102, a tuner; 103, a demodulator; 104, an error correction circuit; 105, a descrambler; 106, a demultiplexer; 107, a switch; 108, a CPU; 109, a source decoder; 110, a video (analog) output terminal; 111, an audio (analog) output terminal; 112, an external apparatus (digital output) connecting terminal.

Operations of such receiving side embodiment will be explained hereunder. More particularly, a signal input from the signal input terminal 101 is tuned and demodulated by the tuner 102 and a baseband signal is output to the demodulator 103. The demodulator 103 demodulates signals such as OFDM, QPSK and QAM which are digitally modulated in the transmitting side and then outputs the demodulated signal to the error correction circuit 104. The error correction circuit 104 corrects various errors, e.g., errors due to the influence of noise generated in the transmission line. As a method of error correction, for example, convolutional encoding using the viterbi code, block encoding using the Reed-Solomon code, or a method using concatenated codes combining the convolutional code and the block code can be used. The combination of the tuner 102, demodulator 103 and error correction circuit 104 represent a channel decoder (illustrated in dashed line form in FIG. 1).

The descrambler 105 descrambles the signals scrambled for the purpose of restricted reception in the transmitting side. Thereafter, the demultiplexer 106 demultiplexes the multiplexed information into encoded video and audio data. The demultiplexed encoded data is decoded by the source decoder 109 which includes D/A converter arrangements. Thereby an analog video signal is output to the video output terminal 110, while an analog audio signal is output to the audio output terminal 111. The analog signals from the video output terminal 110 and the audio output terminal 111 can be accessed by appropriate analog equipment, e.g., an analog VTR, an analog TV, etc. Unauthorized copying of the analog signals can be prevented through any of well known means.

Figure 3:
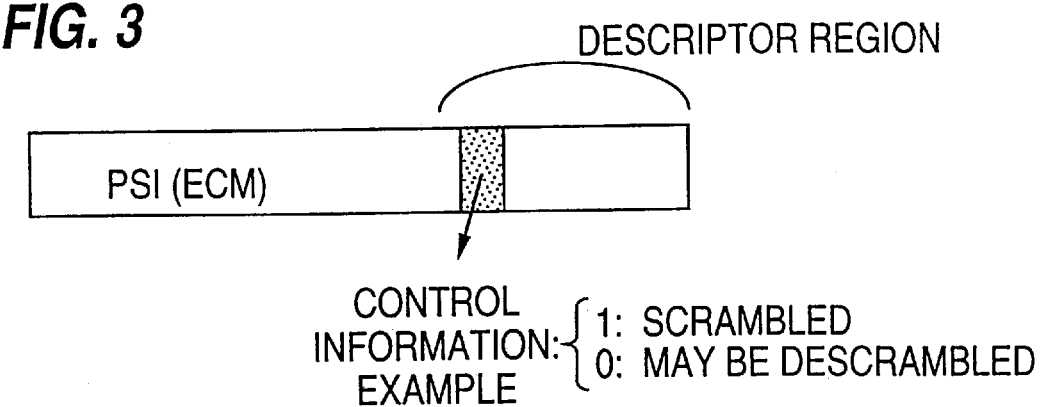
FIG. 3 is a diagram for explaining control information inserted into a transmission signal.

The demultiplexer 106 has a function to extract PSI (Program Specific Information) required for decoding of programs as well as the function for demultiplexing the multiplexed information into the encoded video and audio data. The operation to automatically change over a digital data output to an external apparatus according to a scrambled signal or a descrambled signal on the basis of the control information inserted into the PSI will be explained practically. More particularly, first, control information for determining an appropriate digital data output to the external apparatus, that is, whether digital data should be output to the external apparatus from the stage before or after the descrambler 105 is previously inserted into the signal in the transmitting side. As the inserting method, for example, in the case of MPEG 2, the control information may be inserted into the descriptor region of EMM or ECM in the PSI as shown in FIG. 3.

Meanwhile, in the receiving side, the demultiplexer 106 extracts PSI from the encoded data and outputs such extracted information to the CPU 108, or simply supplies a control output directly to the switch 107. The CPU 108 decrypts the control information inserted in the PSI to determine the digital data output point appropriate for connection to the external apparatus, and controls the changeover operation of the switch 107 depending on the result of decryption. For example, when the control information which determines the data output point is "1", the switch 107 makes the switching operation so that the digital signal in a stage before (i.e., preceding to) the descrambler 105 is output, and thus a scrambled digital signal is output to the external apparatus. On the contrary, when the control information is "0", the switch 107 makes the switching operation so that the descrambled digital signal obtained after the descrambler 105 is output. As a result, an appropriate scrambled signal or the descrambled signal can be output to the external apparatus connecting terminal 112 through an automatic switching operation. As the external apparatus, for example, a DTV (Digital TV), a DVTR (Digital Video Tape Recorder), video disc recorder or a personal computer including a recording medium may be used.

Figure 5:
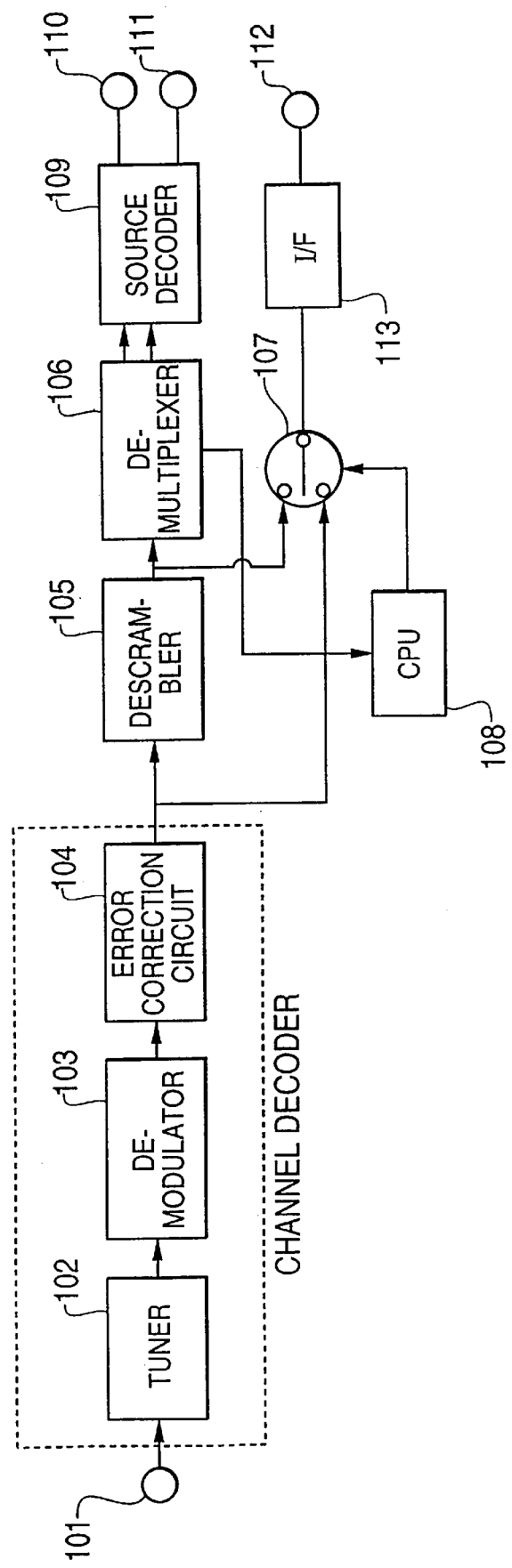
FIG. 5 is a block diagram illustrating a second embodiment of the present invention.

Moreover, as shown in FIG. 5, it is allowed that an interface circuit 113 for matching a rate (e.g., communication rate, bit width, bit rate, etc.) between the receiving apparatus and the external apparatus is inserted between the switch 107 and the external apparatus connecting terminal 112. FIG. 5 is similar to FIG. 1, except for the interface circuit 113.

As explained heretofore, control information to provide control as to whether a scrambled digital signal or descrambled digital signal to be output from the receiver is inserted in the transmitting side. In the receiving side this control information is automatically decrypted to change over to a digital data output point appropriate for connection, thereby to execute a control conforming to the program provider's policy. For instance, in order to avoid a situation where a time-sensitive or per-view chargeable program is repeatedly watched without charge by unauthorized digital recording on a recording medium such as VTR, a scrambled signal is input to the recording medium by inserting control information specifying that "copying is not authorized and scrambled digital data should be output from the receiver". Accordingly, unauthorized digital copying and copyright violations are avoided.

When a viewer desires to watch the program digitally recorded under the scrambled condition, descrambling in the external adapter side is required. Therefore, an approach which allows a descrambling process in the external adapter will be explained.

Figure 4:
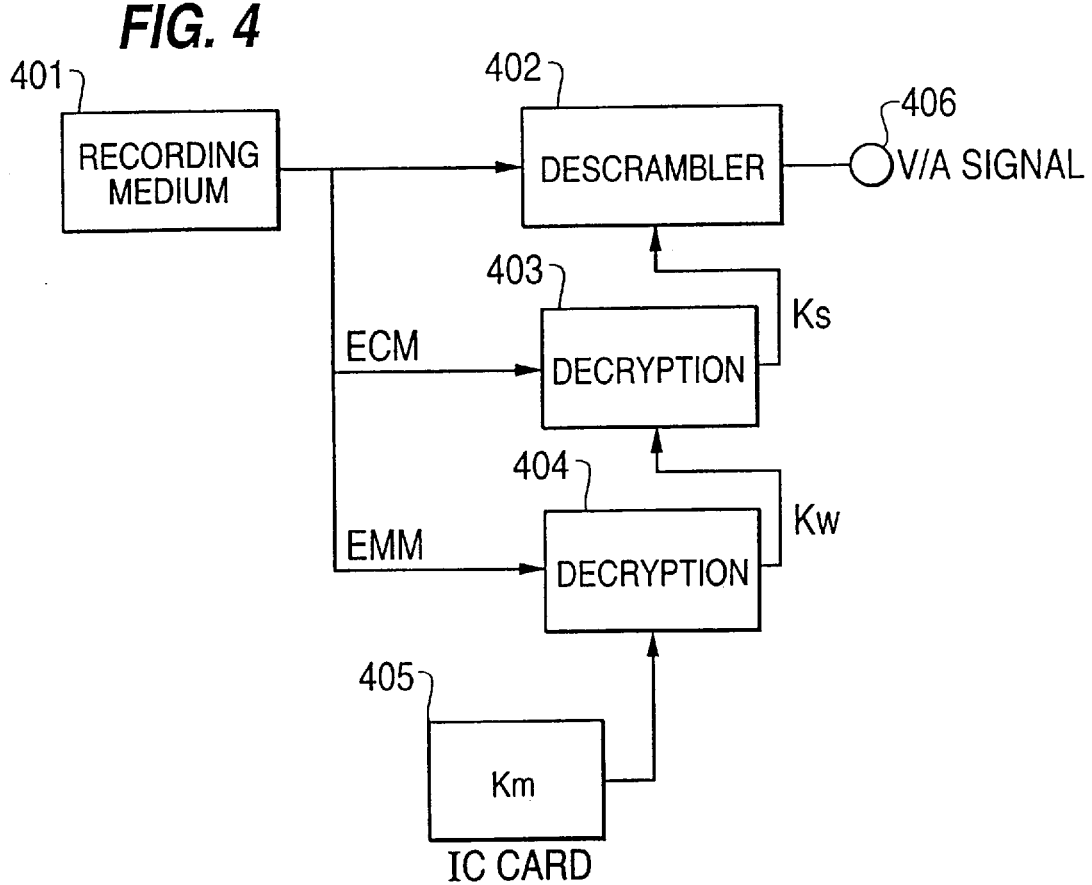
FIG. 4 is a diagram for explaining descramble processing in an external apparatus.

More particularly, FIG. 4 is a block diagram illustrating an example of the descrambling process executed in the external adapter. For descrambling, each key information is necessary. However, as described above, the scramble key (Ks) and the work key (Kw) are inserted into the transmission signal and are then recorded on the recording medium, and accordingly, the scrambled recorded program can be descrambled only by using an authorized master key (Km). When a removable security module such as an IC card in which the master key information is buried is used in the receiver, the scrambled recorded program can also be watched by using this IC card also in the external adapter side as shown in FIG. 4. With the constitution that the watching record information is added to the charging information in the IC card and such charging information is transmitted to the center when the IC card is inserted next into the receiving apparatus, charging can be made depending on a watching time (e.g., elapsed time of watching) or a number of times of watching. When a personal computer is used as the external apparatus, the watching record may be transmitted to the center through, for example, a modem and a telephone line. Here, in FIG. 4, 401 denotes a recording medium; 402, a descrambler; 403, a Ks decrypting means; 404, a Kw decrypting means; 405, an IC card; and 406, an audio-video signal output terminal.

Figure 6:
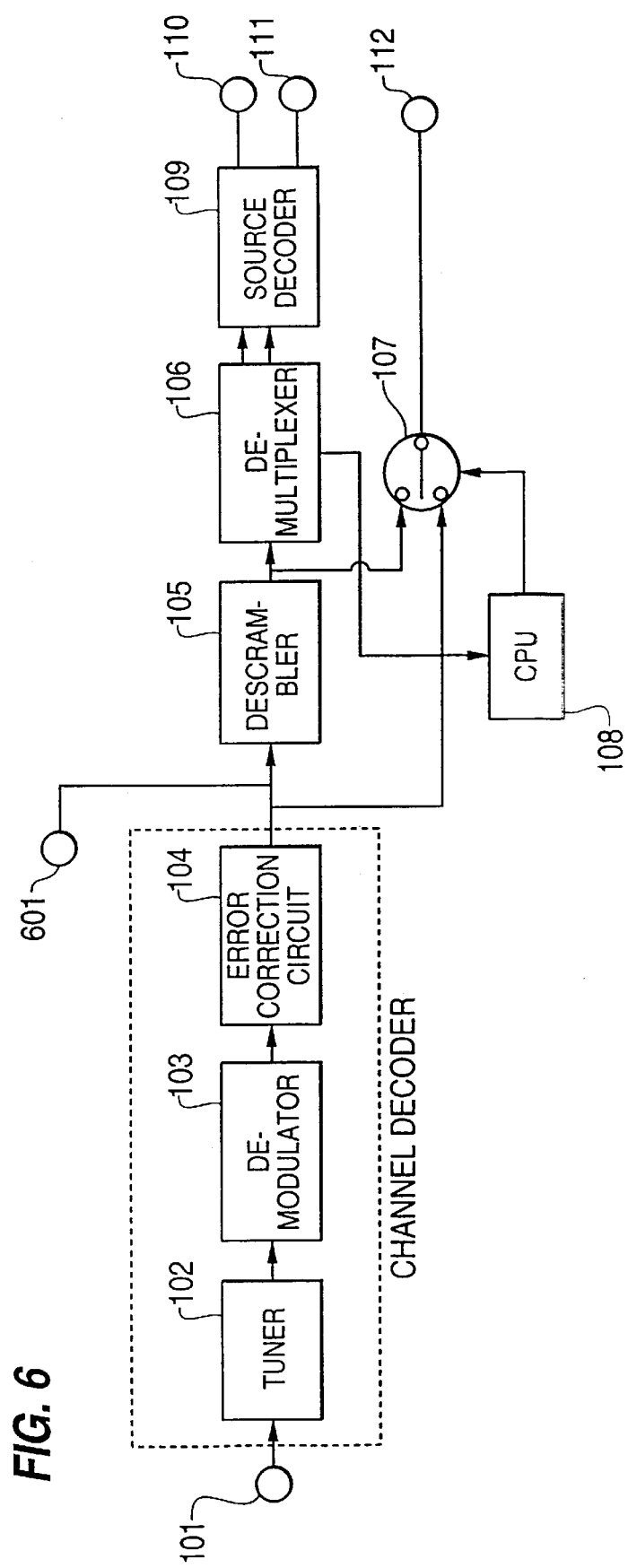
FIG. 6 is a block diagram illustrating a third embodiment of the present invention.

Next, a second example for descrambling a program recorded in the recording medium in an external adapter is illustrated in FIG. 6. In FIG. 6, 601 denotes an external signal input terminal and thus components are similar to FIG. 1. When the scrambled digital signal recorded in the recording medium is input to the external signal input terminal 601, the descrambled signal can be output through the descrambler 105, the demultiplexer 106 and the source decoder 109. In this case, a charge for watching is automatically added to the charging information (e.g., stored in a pollable memory contained within the receiving apparatus). Thereby, a viewer is capable of watching the scrambled recorded program when desired, and the charging information can be automatically recorded.

As explained previously, according to the present invention, the scrambled digital signal or descrambled digital signal can be selected for appropriate output automatically depending on the program provider's policy i.e., according to the arrangement and control information of the present invention.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A digital access control system for preventing unauthorized access to a descrambled digital signal, said system including a digital broadcast receiving system comprising:

a descrambler for receiving a scrambled digital signal and restoring a descrambled digital signal therefrom;

a demultiplexer for demultiplexing the descrambled digital signal and extracting demultiplexed signals and control information therefrom; and a selector for receiving said control information and selectively outputting, according to a content of said control information, an output corresponding to either one of the scrambled digital signal and the descrambled digital signal so as to control access to the descrambled digital signal according to a content of said control information.

2. A digital access control system as claimed in claim 1, wherein said selector is a switch controlled according to the content of said control information.

3. A digital access control system as claimed in claim 2, wherein said selector further comprises a CPU for receiving said control information and controlling said switch according to the content of said control information.

4. A digital access control system as claimed in claim 1, wherein said digital broadcast receiving system further comprises a decoder for receiving said demultiplexed signals and outputting at least one of analog audio and analog video signals corresponding thereto.

5. A digital access control system as claimed in claim 1, wherein said digital broadcast receiving system further comprises an interface circuit for adjusting at least one parameter of said output of said selector to a parameter required by an external apparatus.

6. A digital access control system as claimed in claim 1, further comprising an external input terminal allowing input of a recorded said scrambled digital signal prior to said descrambler, such that said digital broadcast receiving system is able to descramble both a transmitted said scrambled digital signal and a the recorded said scrambled digital signal.

7. A digital access control system as claimed in claim 1, wherein said descrambler performs a descrambling operation according to descrambling key information input to said digital broadcast receiving system.

8. A digital access control system as claimed in claim 7, wherein said descrambling key information is input to said digital broadcast receiving system through at least one of keyboard entry, broadcast transmission, telephone transmission, cable transmission and a key card.

9. A digital access control system as claimed in claim 1:
   wherein said digital broadcast receiving system further comprises a recorder for recording the scrambled digital signal output from said selector;
   and said digital access control system further comprises a digital reproduction system comprising:
      a reproducer for reproducing the scrambled digital signal from a recorded scrambled digital signal;
      a reproduction descrambler for receiving a reproduced scrambled digital signal from said reproducer and restoring a descrambled digital signal therefrom.

10. A digital access control system as claimed in claim 9, wherein said digital reproduction system further comprises:
   a reproduction decoder for receiving said descrambled signal from said reproduction descrambler, and outputting at least one of analog audio and analog video signals corresponding thereto.

11. A digital access control system as claimed in claim 1, further including a digital broadcast transmission system comprising:
   a scrambler for receiving a digital signal and producing a scrambled digital signal therefrom;
   a multiplexer for receiving said scrambled digital signal and control information, and producing a multiplexed digital signal, said control information having a content to control access to the digital signal at a receiver end; and
   a transmitter for transmitting said multiplexed digital signal to said digital broadcast receiving system.

12. A digital access control system for preventing unauthorized access to a descrambled digital signal, said control system comprising:
   a digital broadcast transmission system comprising:
      a scrambler for receiving a digital signal and producing a scrambled digital signal therefrom;
      a multiplexer for receiving said scrambled digital signal and control information, and producing a multiplexed digital signal, said control information having a content to control access to the digital signal at a receiver end; and
      a transmitter for transmitting said multiplexed digital signal; and,
   a digital broadcast receiving system comprising:
      a descrambler for receiving said scrambled digital signal from said digital broadcast transmission system and restoring a descrambled digital signal therefrom;
      a demultiplexer for demultiplexing the descrambled digital signal and extracting demultiplexed signals and said control information therefrom; and
      a selector for receiving said control information from said demultiplexer and selectively outputting, according to a content of said control information, an output corresponding to either one of the scrambled digital signal and the descrambled digital signal so as to control access to the descrambled digital signal according to a content of said control information.

13. A digital access control system as claimed in claim 12, wherein said selector is a switch controlled according to the content of said control information.

14. A digital access control system as claimed in claim 13, wherein said selector further comprises a CPU for receiving said control information and controlling said switch according to the content of said control information.

15. A digital access control system as claimed in claim 12, wherein said digital broadcast receiving system further comprises a decoder for receiving said demultiplexed signals and outputting at least one of analog audio and analog video signals corresponding thereto.

16. A digital access control system as claimed in claim 12, wherein said digital broadcast receiving system further comprises an interface circuit for adjusting at least one parameter of said output of said selector to a parameter required by an external apparatus.

17. A digital access control system as claimed in claim 12, further comprising an external input terminal allowing input of a recorded said scrambled digital signal prior to said descrambler, such that said digital broadcast receiving system is able to descramble both a transmitted said scrambled digital signal and a the recorded said scrambled digital signal.

18. A digital access control system as claimed in claim 12, wherein said descrambler performs a descrambling operation according to descrambling key information input to said digital broadcast receiving system.

19. A digital access control system as claimed in claim 18, wherein said descrambling key information is input to said digital broadcast receiving system through at least one of keyboard entry, broadcast transmission, telephone transmission, cable transmission and a key card.

20. A digital access control system as claimed in claim 12:
   wherein said digital broadcast receiving system further comprises a recorder for recording the scrambled digital signal output from said selector;
   and said digital access control system further comprises a digital reproduction system comprising:
      a reproducer for reproducing the scrambled digital signal from a recorded scrambled digital signal; and
      a reproduction descrambler for receiving a reproduced scrambled digital signal from said reproducer and restoring a descrambled digital signal therefrom.

21. A digital access control system as claimed in claim 20, wherein said digital reproduction system further comprises:
   a reproduction decoder for receiving said descrambled signal from said reproduction descrambler, and outputting at least one of analog audio and analog video signals corresponding thereto.

* * * * *